United States Patent
Zhang et al.

(10) Patent No.: US 9,444,601 B2
(45) Date of Patent: Sep. 13, 2016

(54) METHOD AND DEVICE TO DETERMINE WHEN TO PERFORM HYBRID AUTOMATIC REPEAT REQUEST (HARQ) COMBINATION

(75) Inventors: Wei Zhang, Shenzhen (CN); Feng Wang, Shenzhen (CN); Dandan Guo, Shenzhen (CN); Ming Fang, Shenzhen (CN); Yao Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 152 days.

(21) Appl. No.: 14/364,671

(22) PCT Filed: Apr. 18, 2012

(86) PCT No.: PCT/CN2012/074291
§ 371 (c)(1),
(2), (4) Date: Jun. 11, 2014

(87) PCT Pub. No.: WO2013/086825
PCT Pub. Date: Jun. 20, 2013

(65) Prior Publication Data
US 2014/0376469 A1 Dec. 25, 2014

(30) Foreign Application Priority Data
Dec. 14, 2011 (CN) .......................... 2011 1 0418216

(51) Int. Cl.
*H04L 5/00* (2006.01)
*H04L 25/06* (2006.01)
(Continued)

(52) U.S. Cl.
CPC ........... *H04L 5/0053* (2013.01); *H04L 1/1812* (2013.01); *H04L 1/1845* (2013.01); *H04L 5/0007* (2013.01); *H04L 25/067* (2013.01); *H04L 67/2842* (2013.01)

(58) Field of Classification Search
CPC .................................................. H04L 5/0051
See application file for complete search history.

(56) References Cited

U.S. PATENT DOCUMENTS 7,117,421 B1 * 10/2006 Danilak .................. 714/763
7,730,382 B2    6/2010 Garrett
(Continued)

FOREIGN PATENT DOCUMENTS

CN    101034961 A    9/2007
CN    102208966 A    10/2011
(Continued)

OTHER PUBLICATIONS

International Search Report in international application No. PCT/CN2012/074291, mailed on Sep. 13, 2012.
(Continued)

*Primary Examiner* — Ian N. Moore
*Assistant Examiner* — Mewale Ambaye
(74) *Attorney, Agent, or Firm* — Syncoda LLC; Feng Ma; Junjie Feng

(57) ABSTRACT

A method for Hybrid Automatic Repeat Request (HARQ) combination is disclosed. The method includes that: externally configured parameters relevant to HARQ combination are received, and an identifier ddr2switch of DDR2 switching is calculated to acquire addresses involved before and after the HARQ combination; it is determined, according to the parameters and the addresses involved before and after the HARQ combination, whether the HARQ combination is needed to be performed; and when it is determined that the HARQ combination is needed to be performed, data in a DDR2 are read and stored into a first data cache random access memory RAMA; and a HARQ combination calculation is performed, and the calculation result is stored into a second data cache random access memory RAMB. A device for HARQ combination is further disclosed. The technical solutions provided in the disclosure are based on a latest interference cancellation algorithm, greatly increase the success probability of decoding, saves the storage space of a DDR2 and improves the reading or writing efficiency.

10 Claims, 5 Drawing Sheets

(51) Int. Cl.
*H04L 1/18* (2006.01)
*H04L 29/08* (2006.01)

(56) References Cited

U.S. PATENT DOCUMENTS

| | | | |
|---|---|---|---|
| 2005/0213571 A1* | 9/2005 | Barrack et al. | 370/389 |
| 2006/0291743 A1* | 12/2006 | Partiwala et al. | 382/268 |
| 2007/0263739 A1 | 11/2007 | Garrett et al. | |
| 2008/0276147 A1* | 11/2008 | Gho et al. | 714/748 |
| 2009/0154392 A1 | 6/2009 | Park | |

FOREIGN PATENT DOCUMENTS

| | | |
|---|---|---|
| EP | 2432151 A1 | 3/2012 |
| WO | 2007015455 A1 | 2/2007 |

OTHER PUBLICATIONS

English Translation of the Written Opinion of the International Search Authority in international application No. PCT/CN2012/074291, mailed on Sep. 13, 2012.

Supplementary European Search Report in European application No. 12857417.5, mailed on Apr. 1, 2015.

* cited by examiner

METHOD AND DEVICE TO DETERMINE WHEN TO PERFORM HYBRID AUTOMATIC REPEAT REQUEST (HARQ) COMBINATION

CROSS-REFERENCE TO RELATED APPLICATIONS

The present application is a U.S. National Stage application under 35 U.S.C. 371of, and claims priority to, PCT/CN2012/074291, filed Apr. 18, 2012, which claims priority to Chinese Patent Application No. CN 201110418216.6, filed Dec. 14, 2011. The disclosures of the above applications are hereby incorporated by reference in their entirety.

TECHNICAL FIELD

The disclosure relates to the field of communication, and more particularly to a method and device for Hybrid Automatic Repeat Request (HARQ) combination.

BACKGROUND

In a High Speed Uplink Packet Access (HSUPA) service of a third generation mobile communication system Universal Mobile Telecommunications System (UMTS), an Enhanced Dedicated Channel (E-DCH) symbol-level decoding processing specifically includes a step of de-interleaving, a step of rate de-matching, a step of HARQ combination, a step of Turbo decoding and a step of Cyclic Redundancy Check (CRC) checking, as shown in FIG. 1 which is a flowchart of E-DCH symbol-level decoding. In FIG. 1, the HARQ combination, which is a multi-stop-and-wait parallel retransmission technology combining features of Forward Error Correction (FEC) and Automatic Repeat Request (ARQ), is between the rate de-matching and the Turbo decoding. In a HARQ retransmission mechanism, a User Equipment (UE) sends a data packet, if an NodeB receives the data packet correctly and a CRC checking is correct for the data packet, then a correct decoding indication ACK is returned; otherwise, an error decoding indication NACK is returned. After receiving the NACK, the UE needs to retransmit a corresponding data packet over a physical layer. Information of two or more data packets involved before or after the retransmission is used together in channel decoding, thereby maximizing the success probability of decoding.

An HSUPA E-DCH achieves a HARQ combination by using incremental redundancy technology. For example, as incremental redundancy information providing information for a soft combination of a physical layer is added into the data packet during retransmission, a final coding rate of the whole transmission is reduced even if a coding rate is extremely high in initial transmission, which can achieve an adequate retransmission system gain without bringing any load burden to the system. That is, both a power gain and a coding gain are brought for the system.

A HARQ controlled by the NodeB enables error data to be retransmitted quickly, which reduces a time delay caused by the retransmission over a Radio Link Control (RLC) layer and improves the Quality of Service (QoS) feature of time delay. Moreover, a higher Block Error Rate (BLER) is tolerable on a link, that is, the transmitting power of a corresponding terminal is reduced, as a consequence, more UEs may be supported and the system throughput is accordingly increased on the condition of the same system load.

Even so, existing technologies still have the following technical problems: the existing technologies are unsupportive to a latest interference cancellation algorithm, causing much interference to a UE of high rate, which impacts the performance of HARQ combination; and the existing technologies, which are achieved based on software, are low in data processing efficiency during the transfer process of a large amount of data of Double-Data-Rate Two Synchronous Dynamic Random Access Memory (DDR2) in HARQ combination.

SUMMARY

A technical problem to be solved by the disclosure is to provide a method for HARQ combination to solve problems in HARQ combination in existing technologies, and is further to provide a device for HARQ combination.

To this end, a method for HARQ combination is provided in an embodiment of the disclosure, which includes:

externally configured parameters relevant to HARQ combination are received, and an identifier ddr2switch of DDR2 switching is calculated to acquire addresses involved before and after the HARQ combination;

it is determined, according to the parameters and the addresses involved before and after the HARQ combination, whether the HARQ combination is needed to be performed; and when it is determined that the HARQ combination is needed to be performed, data in a DDR2 are read and stored into a first data cache random access memory RAMA; and a HARQ combination calculation is performed, and the calculation result is stored into a second data cache random access memory RAMB.

Further, in the method, the received externally configured parameters relevant to HARQ combination may include: new_ue indicating whether a packet sent by a User Equipment (UE) is a new packet; e_demodnum indicating current transmission is which demodulation of the same UE; harq_en indicating whether the HARQ combination is needed to be performed; harq_num indicating a times of retransmission for the HARQ combination; harq_addr indicating an address related to the HARQ combination; and two gain factors b1 and b2 for the HARQ combination.

Further, in the method, the process that the identifier ddr2switch of DDR2 switching is calculated to acquire the addresses involved before and after the HARQ combination may specifically includes:

the addresses involved before and after the HARQ combination are acquired according to the ddr2switch and harq_addr, wherein the ddr2switch is an identifier indicating whether ping-pong switching is performed on the DDR2, and ddr2swtich1 is an identifier indicating whether next ping-pong switching is performed on the DDR2;

when a packet sent by the UE is a new packet, the ddr2switch is assigned with 0;

when the HARQ combination is performed and Demodnum is equal to 01, then the ddr2switch is assigned with a value of the ddr2switch1; and when harq_en is equal to 1 and Demodnum is not equal to 01, the ddr2switch is kept unchanged; and when a packet sent by the UE is a new packet, the ddr2switch1 is assigned with 1; when harq_en is equal to 1 and Demodnum is equal to 01, the ddr2switch is inverted; and when harq_en is equal to 1 and Demodnum is not equal to 01, the ddr2switch1 is kept unchanged.

Further, in the method, the process that it is determined, according to the parameters and the addresses involved before and after the HARQ combination, whether the HARQ combination is needed to be performed; and when it is determined that the HARQ combination is needed to be performed, data in a DDR2 are read and stored into a first data cache RAMA may specifically include:

it is determined, according to the read harq_en, whether the HARQ combination is needed to be performed; and when harq_en is equal to 1, it is indicated that the HARQ combination is needed to be performed, data in the DDR2 are read according to the calculated address involved before the HARQ combination, and the data in the DDR2 are stored into the RAMA.

Further, in the method, the process that a HARQ combination calculation is performed and the calculation result is stored into a second data cache RAMB may specifically include:

data of previous HARQ combination in the RAMA are read, the read data are multiplied by the gain factor b1, data resulting from rate de-matching are multiplied by the gain factor b2, the two products are added to obtain the result of the HARQ combination, i.e., the result obtained by multiplying the data before the HARQ combination by b1 plus multiplying the data resulting from the HARQ combination by b2; and the result of the HARQ combination is stored into the RAMB.

Further, the method may further include:

the data in the RAMB resulting from the HARQ combination are transferred into the DDR2 according to the address involved after the HARQ combination; and it is gone ready to receive next data of the UE.

A device for HARQ combination is further provided in an embodiment of the disclosure, which includes: a parameter control unit, a data cache unit and an accumulation unit, wherein the parameter control unit is configured to receive externally configured parameters relevant to HARQ combination, and calculate an identifier ddr2switch of DDR2 switching to acquire addresses involved before and after the HARQ combination:

the data cache unit is configured to: determine, according to the parameters and the addresses involved before and after the HARQ combination, whether the HARQ combination is needed to be performed; and when it is determined that the HARQ combination is needed to be performed, read data in a DDR2, and store the data into a first data cache random access memory RAMA; and the accumulation unit is configured to perform a HARQ combination calculation and store the calculation result into a second data cache random access memory RAMB.

Further, in the device, the externally configured parameters relevant to HARQ combination received by the parameter control unit may include: e_demodnum indicating current transmission is which demodulation of a same User Equipment (UE); harq_en indicating whether the HARQ combination is needed to be performed; harq_num indicating a times of retransmission for the HARQ combination; harq_addr indicating an address related to the HARQ combination; and two gain factors b1 and b2 for the HARQ combination.

Further, in the device, the accumulation unit may be further configured to transfer data in the RAMB resulting from the HARQ combination into the DDR2 according to the address involved after the HARQ combination, and get ready to receive next data of the UE.

Compared with the existing technologies, the technical solution of the disclosure is based on the latest interference cancellation algorithm according to which the same UE supports a plurality of times of demodulation, including first demodulation, secondary demodulation and re-demodulation; greatly increases the success probability of decoding by canceling interference signals during a decoding process; saves the storage space of an DDR2, reduces the times of frequent reading/writing of the DDR2 and improves a reading/writing efficiency by dynamically switching the DDR2 during a DDR2 transfer process; and supports flexible configuration of coefficients for HARQ combination.

DETAILED DESCRIPTION

In order to make the technical problem to be solved, the technical solution and beneficial effects of the disclosure clearer and easier to understand, the disclosure is further elaborated below with reference to the drawings and embodiments. It should be understood that the specific embodiments described here are only intended to interpret the disclosure instead of limiting the disclosure.

Figure 1:
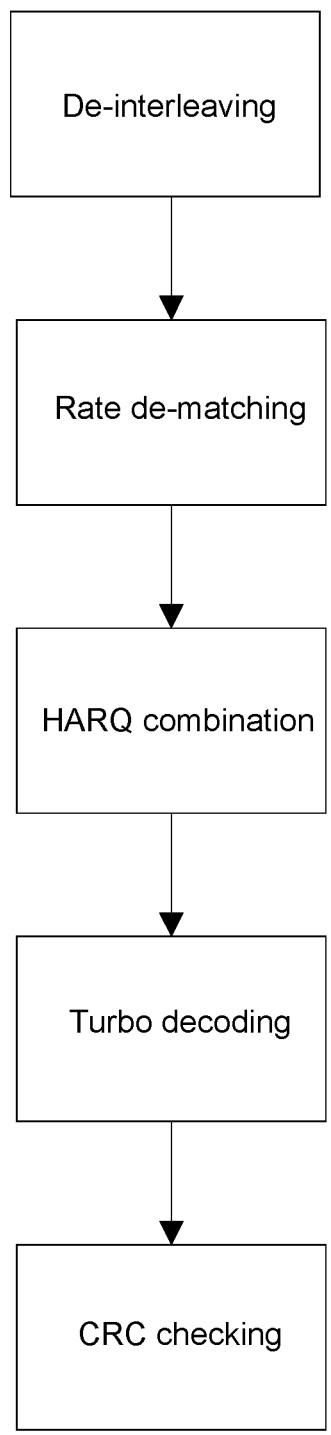
FIG. 1 is a flowchart of E-DCH symbol-level decoding.
Figure 2:
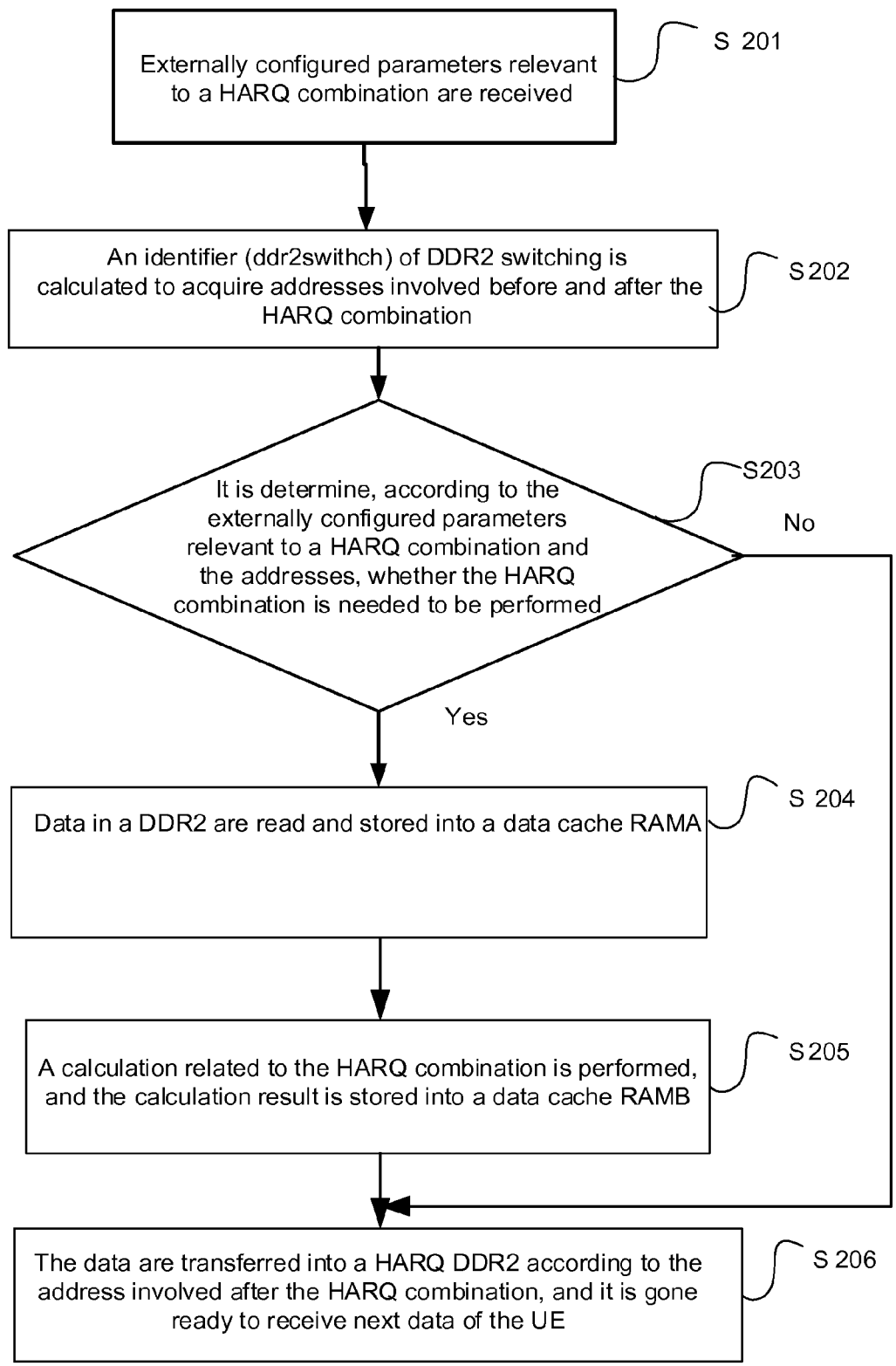
FIG. 2 is a flowchart of a first embodiment of the disclosure.

As shown in FIG. 2, which is a flowchart of a first embodiment of the disclosure, a method for HARQ combination provided in the first embodiment of the disclosure is specifically includes:

Step S201: Externally configured parameters relevant to a HARQ combination are received.

As an example, the externally configured parameters relevant to the HARQ combination include: new_ue indicating whether a packet sent by a current UE is a new packet; e_demodnum indicating current transmission is which demodulation of the same UE, the same UE may perform rescheduling and retransmission three times after the decoding of the HAW) combination is failed, the first rescheduling and retransmission is recorded as a first demodulation, the second rescheduling and retransmission is recorded as a second demodulation and the third rescheduling and retransmission is recorded as a re-demodulation, e_demodnum being 1 indicates the first demodulation of the same UE, e_demodnum being 2 indicates the second demodulation of the same UE, and e_demodnum being 3 indicates the re-demodulation of the same UE; harq_en indicating whether the HARQ combination is needed to be performed; harq_num indicating times of HARQ retransmission; harq_addr indicating an address related to the HARQ combination; and b1 and b2 indicating two gain factors of the HARQ combination.

The gain factors of HARQ combination determine the gain of decoding information and the performance of a system, and different gain factors of HARQ combination may be used according to different channel qualities. The gain factors of HARQ combination received in the embodiment are shown by default in Table 1.

TABLE 1

| | Times of HARQ retransmission | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| b1 | 0 | 0 | 1 | 0 | 1 | 0 | 0 | 0 | 1 | 0 | 0 | 0 | 0 | 0 | 0 | 0 |
| b2 | 0 | 0 | 1 | 1 | 2 | 2 | 2 | 2 | 3 | 3 | 3 | 3 | 3 | 3 | 3 | 3 |

Other configured coefficients for HARQ combination are also supported in the embodiment.

Step S202: An identifier ddr2swithch of DDR2 switching is calculated to acquire addresses involved before and after the HARQ combination.

Figure 3:
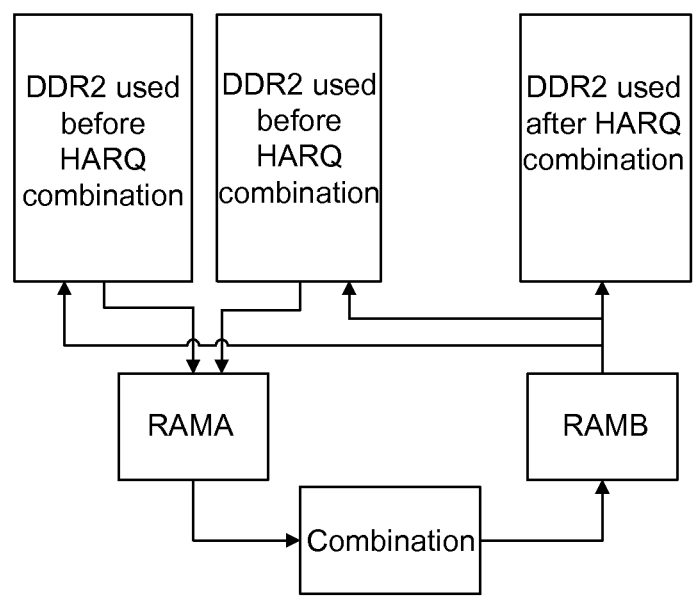
FIG. 3 is a schematic diagram illustrating simple DDR2 transfer.

As an example, since a latest interference cancellation algorithm is supported, that is, a first demodulation, a second demodulation and a re-demodulation are supported, latest transmitted data needs to be stored twice for a HARQ combination. Since a HARQ supports eight 2 ms processes and four 10 ms processes, a very large space is needed if there are a great number of UEs: two large spaces of the same size are created before a HARQ combination and a large space is created after the HARQ combination, as shown in FIG. 3 which is a schematic diagram illustrating simple DDR2 transfer. Data of the latest HARQ combination and data of the previous HARQ combination are stored before the HARQ combination. If the current transmission e_demodnum is equal to 01, then the data of the latest HARQ combination and current data are taken for a HARQ combination. If the current transmission is the second demodulation or re-demodulation, then data resulting from the previous HARQ combination and the current data are taken for a HARQ combination. Data resulting from a HARQ combination are stored in a DDR2 used for storing data resulting from a HARQ combination, and are also needed to be stored into a DDR2 used for storing data before a HARQ combination. As a consequence, the space of the DDR2 to be needed is large, and there are too many times of transfer, thereby occupying much bandwidth.

Figure 4:
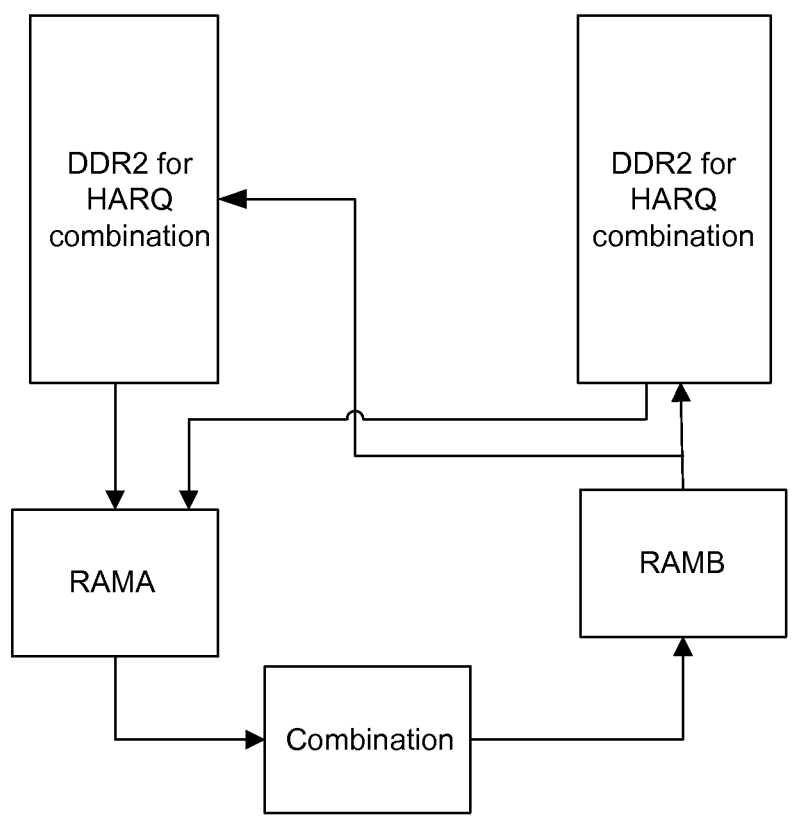
FIG. 4 is a schematic diagram illustrating optimized DDR2 transfer.

As shown in FIG. 4, which is a schematic diagram illustrating optimized DDR2 transfer, two DDR2s of the same size are used, and the addresses of the two DDR2s differ by a fixed value, which is identified by an introduced identifier of DDR2 ping-pong switching, and the identifier of DDR2 ping-pong switching is marked as ddr2swtich. When the ddr2switch is equal to 0, it is indicated that data of a DDR1 are read, and data resulting from a HARQ combination are written into a DDR2. When the ddr2switch is equal to 1, it is indicated that data of the DDR2 are read, and data resulting from a HARQ combination are written into the DDR2, thereby reducing the storage space of the DDR2 and the transfer times of data of the DDR2.

A method for calculating ddr2switch may be as follows:

A parameter ddr2swithch is recorded as an identifier indicating whether ping-pong switching is performed on a DDR2, and a parameter ddr2swtich1 is recorded as an identifier indicating whether next ping-pong switching is performed on the DDR2.

(1) Value of the parameter ddr2switch

A calculation process is as follows:

if new_ue is equal to 1, then it is indicated that a packet sent by the current UE is a new packet, and the ddr2switch is assigned with 0; and if new_ue is equal to 0, then the following determination is further made:

if harq_en is equal to 1, which indicates that the HARQ combination is needed to be performed, and the Demodnum is equal to 01, then the ddr2switch is assigned with the value of ddr2switch1, and in other cases, the ddr2switch is kept unchanged.

(2) Value of the parameter ddr2switch1

A calculation process is as follows:

if new_ue is equal to 1, it is indicated that a packet sent by the current UE is a new packet, and the ddr2switch1 is assigned with 1; and If new_ue is equal to 0, then the following determination is further made:

if harq_en is 1, which indicates that the HARQ combination is needed to be performed. and Demodnum is equal to 01, then the ddr2switch1 is inverted; and if harq_en is 1, which indicates that the HARQ combination is needed to be performed. and Demodnum is not equal to 01, then the ddr2switch1 is kept unchanged.

Addresses involved before and after the HAW) combination may be acquired according to the ddr2switch and harq_addr, and the addresses involved before and after the HARQ combination are recorded as harq_addr_b and harq_addr_e respectively.

Step S203: it is determine, according to the externally configured parameters relevant to a HARQ combination and the addresses, whether the HARQ combination is needed to be performed. Step S204 is executed if the HARQ combination is needed to be performed, and the flow is directly gone to Step S206 if the HARQ combination is not needed to be performed.

As an example, the indicator indicating whether to perform a HARQ combination read in Step S201 is marked as harq_en. If harq_en is equal to 0, no relevant operation is performed and the flow is directly gone to Step S205. If harq_en is equal to 1, it is indicated that the HARQ combination is needed to be performed, data of a DDR2 are read according to the address harq_addr_b calculated in Step S202, and the data are stored into the RAMA.

Step S204: Data in a DDR2 are read and stored into a data cache RAMA.

Step S205: A calculation related to the HARQ combination is performed, and the calculation result is stored into a data cache RAMB.

As an example, the data in the RAMA resulting from the previous HARQ combination are read according to received gain factors for HARQ combination, and are multiplied by the gain factor b1, data resulting from rate de-matching are multiplied by the gain factor b2, and the two products are added to obtain a result resulting from the HARQ combination, i.e., the result obtained by multiplying data before the HARQ combination by b1 plus multiplying data resulting from HARQ combination by b2, and the result is stored into the RAMB.

Step S206: The data are transferred into a HARQ DDR2 according to the address involved after the HARQ combination, and it is gone ready to receive next data of the UE.

As an example, the data of the RAMB resulting from the HARQ combination are transferred into a DDR2 according to an address harq_addr_e calculated by a parameter control unit, so as to complete the current HARQ combination processing, and then the next new HARQ combination is to be performed.

As a specific solution of the aforementioned embodiment, the embodiment may be implemented as follows:

(1) Externally configured parameters e_demodnum, harq_en, harq_num, harq_addr, b1 and b2 for a HARQ combination are received, and it is assumed that e_demodnum is equal to 01, harq_en is equal to 1, harq_num is equal to 7 and harq_addr is 51609600.

(2) It is obtained based on harq_num being 7 that b1 and b2 are equal to 0 and 2 respectively. If the previous ddr2switch1 is assumed to be 1, then ddr2switch is equal to 0. If harq_addr is 51609600, then harq_addr_e is 51609700 and harq_addr_b is 100.

(3) Data before the HARQ combination are read based on harq_en being equal to 1 and harq_addr_b being 100, and are stored in a RAMA.

(4) Since b2 is equal to 2, the data before the HARQ combination are right shifted by 2 bits and are added with data resulting from rate de-matching, and the added data are then stored into a RAMB.

(5) Based on harq_add_e being 51609700, the added data are stored into a DDR2 the address of which is 51609700.

Figure 5:
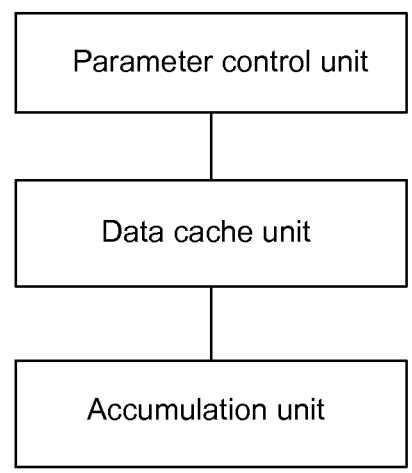
FIG. 5 is a structural diagram of a second embodiment of the disclosure.

As shown in FIG. 5, which is a diagram illustrating the structure of a second embodiment of the disclosure, a device for HARQ combination disclosed herein includes:

the parameter control unit is configured to receive externally configured parameters relevant to HARQ combination, and calculate an identifier ddr2switch of DDR2 switching to acquire addresses involved before and after the HARQ combination;

the data cache unit is configured to: determine, according to the parameters and the addresses involved before and after the HAW) combination, whether the HARQ combination is needed to be performed; and when it is determined that the HARQ combination is needed to be performed, read data in a DDR2, and store the data into a first data cache RAMA; and the accumulation unit is configured to perform a HARQ combination calculation and store the calculation result into a second data cache RAMB.

In the device, the externally configured parameters relevant to HARQ combination received by the parameter control unit include: e_demodnum indicating current transmission is which demodulation of a same UE; harq_en indicating whether the HARQ combination is needed to be performed; harq_num indicating a times of retransmission for the HARQ combination; harq_addr indicating an address related to the HARQ combination; and two gain factors b1 and b2 for the HARQ combination.

In the device, the accumulation unit is further configured to transfer data in the RAMB resulting from the HARQ combination into the DDR2 according to the address involved after the HARQ combination, and get ready to receive next data of the UE.

The foregoing description illustrates and describes the preferable embodiments of the disclosure. However, as previously mentioned, it should be understood that the disclosure is not restricted to the form disclosed by the present document and should not be regarded as exclusion of other embodiments, but can be used to various other combinations, modifications and environments and can be modified according to the above teaching or technologies or knowledge of related fields within the scope of conception of the disclosure described in the present document. Furthermore, modifications and changes made by those skilled in the art without departing from the spirit and principle of the disclosure shall fall within the scope of protection of the claims of the disclosure.

The invention claimed is:

1. A method and a base station for Hybrid Automatic Repeat Request HARQ combination, comprising:
    receiving a data packet embedded with externally configured parameters relevant to the HARQ combination from a User Equipment (UE), and calculating an identifier ddr2switch of Double-Data-Rate Two (DDR2) switching, to acquire addresses involved before and after the HARQ combination;
    wherein, the ddr2switch is an identifier indicating whether ping-pong switching is performed on the DDR2;
    determining, according to the parameters and the addresses involved before and after the HARQ combination, whether the HARQ combination is needed to be performed;
    when the HARQ combination is needed to be performed:
    reading data in DDR2,
    storing data into a first data cache random access memory RAMA, and
    calculate a HARQ combination on the read data stored in the first RAMA;
    storing the calculated HARQ combination into a second data cache random access memory RAMB; and
    transferring the calculated HARQ combination in the RAMB into the DDR2 to reduce both storage space of the DDR2 and transfer times of data of the DDR2;
    wherein the received externally configured parameters relevant to HARQ combination comprise:
    new ue indicating whether the data packet sent by a User Equipment, the UE is a new packet;
    e_demodnum indicating current transmission is which demodulation of the same UE;
    harq_en indicating whether the HARQ combination is needed to be performed;
    harq_num indicating a times of retransmission for the HARQ combination;
    harq_addr indicating an address related to the HARQ combination; and
    two gain factors b1 and b2 for the HARQ combination.

2. The method according to claim 1, wherein the step of calculating an identifier ddr2switch of DDR2 switching to acquire addresses involved before and after the HARQ combination comprises:
    acquiring the addresses involved before and after the HARQ combination according to the ddr2switch and harq_addr, wherein the ddr2switch is an identifier indicating whether ping-pong switching is performed on the DDR2, and ddr2switch1 is an identifier indicating whether next ping-pong switching is performed on the DDR2;
    when new_ue is equal to 1, it is indicated that a packet sent by the UE is a new packet, and the ddr2switch is assigned with 0;
    when harq_en is equal to 1 and Demodnum is equal to 01, the ddr2switch is assigned with a value of the ddr2switch1; and
    when harq_en is equal to 1 and Demodnum is not equal to 01, the ddr2switch is kept unchanged; and
    when new_ue is equal to 1,
        it is indicated that a packet sent by the UE is a new packet, and the ddr2switch1 is assigned with 1;
    when new_ue is equal to 0,
        when harq_en is equal to 1 and Demodnum is equal to 01, the ddr2switch1 is inverted; and when harq_en is equal to 1 and Demodnum is not equal to 01, the ddr2switch1 is kept unchanged.

3. The method according to claim 2, wherein the step of determining, according to the parameters and the addresses involved before and after the HARQ combination, whether the HARQ combination is needed to be performed; and when is determined that the HARQ combination is needed to be performed, reading data in a DDR2, and storing the data into the first data cache RAMA comprises: determining, according to the read harq_en, whether the HARQ combination is needed to be performed; and when harq_en is equal to 1, the read $harq_{13}$ en is indicated that the HARQ combination is needed to be performed, reading data in the DDR2 according to the calculated address involved before the HARQ combination, and storing the data into the RAMA.

4. The method according to claim 3, wherein the step of performing a HARQ combination calculation and storing the calculation result into the second data cache RAMB comprises:

reading data of previous HARQ combination in the RAMA, multiplying the read data by the gain factor b1, multiplying data resulting from rate de-matching by the gain factor b2, adding the two products to obtain the result of the HARQ combination as the result obtained by multiplying the data before the HARQ combination by b1 plus multiplying the data resulting from the HARQ combination by b2; and storing the result of the HARQ combination into the RAMB.

5. The method according to claim 1, further comprising: transferring the data in the RAMB resulting from the HARQ combination into the DDR2 according to the address involved after the HARQ combination; and getting ready to receive next data of the UE.

6. A base station for Hybrid Automatic Repeat Request (HARQ) combination, comprising:

a memory storing instructions; and a processor coupled to the memory executing the instructions to implement a parameter control unit, a data cache unit and an accumulation unit, wherein the parameter control unit is configured to receive a data packet embedded with externally configured parameters relevant to the HARQ combination from a user equipment (UE), and calculate an identifier ddr2switch of Double-Data-Rate Two, (DDR2) switching, to acquire addresses involved before and after the HARQ combination;

wherein, the ddr2switch is an identifier indicating whether ping-pong switching is performed on the DDR2;

the data cache unit is configured to:

determine, according to the parameters and the addresses involved before and after the HARQ combination, whether the HARQ combination is needed to be performed;

when the HARQ combination is needed to be performed: reading data in a DDR2, storing the data into a first data cache random access memory RAMA, and the accumulation unit is configured to calculate a HARQ combination on the read data stored into the first RAMA;

storing the calculated HARQ combination into a second data cache random access memory RAMB; and transfer the calculated HARQ combination in the RAMB into the DDR2 to reduce a storage space of the DDR2 and a transfer times of data of the DDR2;

wherein the externally configured parameters relevant to HARQ combination received by the parameter control unit comprise:

new ue indicating whether the data packet sent by a User Equipment, the UE is a new packet;

e_demodnum indicating current transmission is which demodulation of the same UE;

harq_en indicating whether the HARQ combination is needed to be performed;

harq_num indicating a times of retransmission for the HARQ combination;

harq_addr indicating an address related to the HARQ combination; and two gain factors b1 and b2 for the HARQ combination.

7. The device according to claim 6, wherein the accumulation unit is further configured to transfer data in the RAMB resulting from the HARQ combination into the DDR2 according to the address involved after the HARQ combination, and get ready to receive next data of the UE.

8. The method according to claim 2, further comprising: transferring the data in the RAMB resulting from the HARQ combination into the DDR2 according to the address involved after the HARQ combination; and getting ready to receive next data of the UE.

9. The method according to claim 3, further comprising: transferring the data in the RAMB resulting from the HARQ combination into the DDR2 according to the address involved after the HARQ combination; and getting ready to receive next data of the UE.

10. The method according to claim 4, further comprising: transferring the data in the RAMB resulting from the HARQ combination into the DDR2 according to the address involved after the HARQ combination; and getting ready to receive next data of the UE.

* * * * *